(12) United States Patent
Cai et al.

(10) Patent No.: US 11,503,127 B2
(45) Date of Patent: Nov. 15, 2022

(54) ENTITY-STICKY-ROUTING RANKING FEATURE PREFETCH IN MICROSERVICE ARCHITECTURE

(71) Applicant: Microsoft Technology Licensing, LLC, Redmond, WA (US)

(72) Inventors: Tao Cai, Sunnyvale, CA (US); Tianchen Yu, Sunnyvale, CA (US); Sara Smoot Gerrard, Redwood City, CA (US); Sanjay Agarwal, Sunnyvale, CA (US); Meilin Yang, Sunnyvale, CA (US); Zhongwei Jiang, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/036,856

(22) Filed: Sep. 29, 2020

(65) Prior Publication Data

US 2022/0103643 A1    Mar. 31, 2022

(51) Int. Cl.
*G06F 15/173* (2006.01)
*H04L 67/51* (2022.01)
*H04L 67/30* (2022.01)
*H04L 67/568* (2022.01)

(52) U.S. Cl.
CPC .............. *H04L 67/51* (2022.05); *H04L 67/30* (2013.01); *H04L 67/568* (2022.05)

(58) Field of Classification Search
CPC . H04L 67/16; H04L 67/2814; H04L 67/2842; H04L 67/51; H04L 67/568; H04L 67/30
USPC ........................................................ 709/223
See application file for complete search history.

(56) References Cited

U.S. PATENT DOCUMENTS

| | | | | |
|---|---|---|---|---|
| 9,892,431 | B1* | 2/2018 | Agrawal | G06Q 30/0275 |
| 2018/0077259 | A1* | 3/2018 | Wei | G06Q 30/0251 |
| 2018/0308124 | A1* | 10/2018 | Gao | G06N 5/003 |
| 2020/0410528 | A1* | 12/2020 | Haribhaskaran | G06Q 30/0246 |
| 2021/0136141 | A1* | 5/2021 | Tidemann | H04L 47/2483 |

* cited by examiner

*Primary Examiner* — Hee Soo Kim
(74) *Attorney, Agent, or Firm* — NDWE, LLP

(57) ABSTRACT

Techniques for performing prefetching for a ranking service in a microservice architecture are provided. In one technique, in response to receiving a content request, an entity identifier of an entity associated with the content request is determined, a host of a second service that is different than the first service is determined. The first service sends the entity identifier to the host of the second service. The second service retrieves entity feature data that is associated with the entity identifier. The first service identifies a set of content delivery campaigns, identifies the host of the second service, and sends the identity of the set of content delivery campaigns to the host of the second service. The host of the second service determines a ranking of the set of content delivery campaigns, a subset thereof is selected, and data about each selected campaign is transmitted over a computer network.

20 Claims, 4 Drawing Sheets

ENTITY-STICKY-ROUTING RANKING FEATURE PREFETCH IN MICROSERVICE ARCHITECTURE

TECHNICAL FIELD

The present disclosure generally relates to a microservice architecture and, more specifically, to employing entity-sticking routing when prefetching data for a ranking service in response to an electronic request.

BACKGROUND

Enterprises that host platforms that deliver electronic content may implement their platforms using one of two main architectures: a monolithic architecture and a microservice architecture. In a monolithic architecture, a single service executing on a single machine implements all, or the majority, of the functions needed or required to process and respond to a content request, such as from a client device that is remote to the machine. The monolithic architecture may comprise multiple machines, each executing a different instance of the same service. The service may rely on a separate (e.g., local) database or storage system to access data in order to respond to the content request. One downside to this approach is that, as the functions become increasingly complex, it becomes impractical for a single developer or team to maintain and upgrade the service. It is more efficient for different teams to maintain and upgrade different functions. However, in a monolithic architecture, each team needs access to the same codebase and update the same codebase, sometimes concurrently.

In a microservice architecture, major functions of an application are typically implemented in different services, with different developers or teams assigned to maintaining and upgrading the different services. Some characteristics of services in a microservice architecture (or "microservices") include such services often being: (a) processes that communicate over a network to fulfill a goal using technology-agnostic protocols such as HTTP; (b) independently deployable; (c) organized around business capabilities; (d) small in size, messaging-enabled, bounded by contexts, autonomously developed, independently deployable, decentralized, and built and released with automated processes. Microservices may be implemented using different programming languages, databases, hardware and software environment, depending on what fits best.

A microservice is not a layer within a monolithic application, but is rather a self-contained piece of functionality with clear interfaces, and may, through its own internal components, implement a layered architecture. A microservice architecture lends itself to a continuous delivery software development process. A change to a small part of an application requires rebuilding and redeploying only one or a small number of microservices. A microservice architecture adheres to principles, such as fine-grained interfaces (to independently deployable services) and business-driven development (e.g. domain-driven design).

Benefits of a decomposing an application into different smaller services include modularity, scalability, integration of heterogenous and legacy systems, and distributed development. Modularity makes the application easier to understand, develop, test, and become more resilient to architecture erosion. Regarding scalability, because microservices are implemented and deployed independently of each other, microservices are run within independent processes and, thus, can be monitored and scaled independently. Regarding integration, microservices is considered as a viable means for modernizing existing monolithic software applications using an incremental approach. Regarding distributed development, a microservice architecture parallelizes development by enabling small autonomous teams to develop, deploy, and scale their respective services independently. This allows the architecture of an individual service to emerge through continuous refactoring. Microservice architectures facilitate continuous integration, continuous delivery, and deployment.

However, a microservice architecture does not come without costs. One advantage that a monolithic architecture has over a microservice architecture is that some optimization solutions are easier to implement in parallel, it is generally more difficult to perform some optimization solutions (e.g., prefetching) in parallel in a microservice environment. It is challenging to implement prefetching in a microservice architecture since different microservices of the same application might not share the same local cache and one microservice cannot be called or initiated until another microservice completes. To parallelize execution, a service can perform some prefetching. For example, the service might fetch some data in advance so that the data can be used in a later stage. The prefetch is easy to implement in a monolithic architecture because the prefetch result is shared between different modules in one service. However, in a microservice architecture, prefetching is difficult to implement because the prefetch result is not shared across different hosts.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
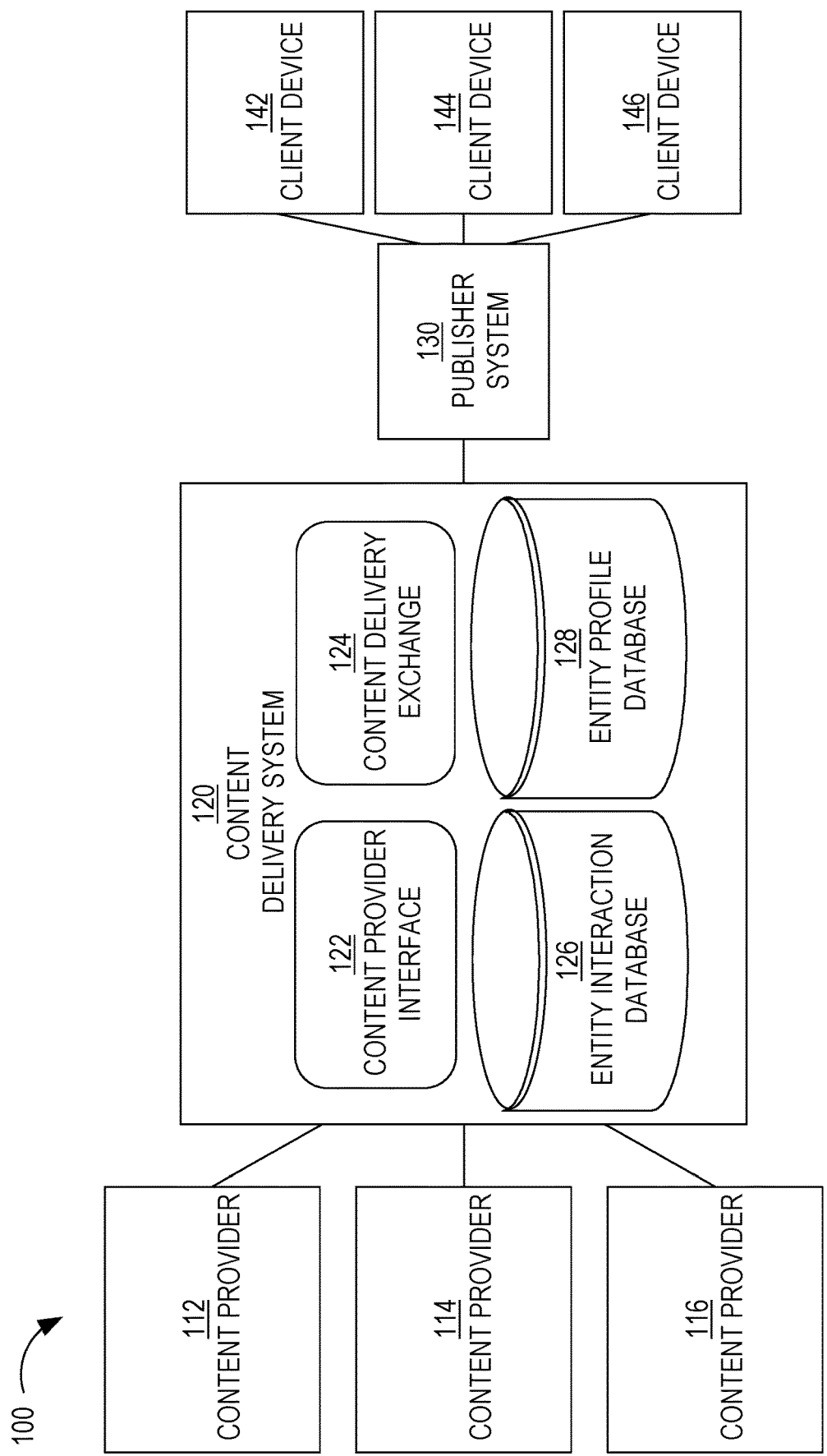
FIG. 1 is a block diagram that depicts a system for distributing content items to one or more end-users, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for processing content requests in a microservice architecture are provided. In one technique, certain data is prefetched using entity-sticking routing. Specifically, a first service sends an entity key (or identifier) to a second service. The second service fetches or retrieves certain data based on the entity key while the first service performs its functions. By the time that the first service sends the result of its processing to the second service, the second service may have retrieved the certain data or may be in the process of retrieving the certain data. In this way, the second service is performing its functions in parallel with the first service.

In an embodiment, the first service is a microservice that identifies candidate content delivery campaigns in response to a content request that is initiated by an entity, such as a user. The second service is a microservice that depends on the first service in that the second service ranks the candidate content delivery campaigns. The "certain data" is data that is needed to rank the candidate content delivery campaigns relative to each other. With the ranking, the second service (or another service) selects a strict subset of the candidate content delivery campaigns, and content items associated with that strict subset are returned to the computing system (e.g., a third party content exchange) that initiated the content request.

Embodiments improve computer technology by reducing the time to respond to content requests. The reduction in time may be tens of milliseconds, which allows for the possibility of making further enhancements to one or more microservices to perform additional functionality while keeping an overall processing time to under a particular amount, such as one specified by a service-level agreement (SLA). Also, embodiments avoid: (1) the downfalls of implementing a monolithic architecture; (2) implementing a remote cache that would have to be created and maintained to temporarily store the "certain data" that both microservices would access; (3) violating the principles of the microservice architecture by requiring the first service to perform the prefetching and sending the certain data to the second service; and (4) reduction in processing capabilities that would result from implementing keep alive connections between hosts executing the first service and hosts executing the second service. Regarding the remote cache, such a cache may add additional cost because the first service must use CPU and network resources to communicate with the remote cache. Also, it may be expensive to access the remote cache if the data payload is large. Regarding the violation of microservice architecture principles, as a result of the first service needing to be aware of the second service's logic, the two services become tightly coupled with each together, which violates the aforementioned principles.

System Overview

FIG. 1 is a block diagram that depicts a system 100 for distributing content items to one or more end-users, in an embodiment. System 100 includes content providers 112-116, a content delivery system 120, a publisher system 130, and client devices 142-146. Although three content providers are depicted, system 100 may include more or less content providers. Similarly, system 100 may include more than one publisher and more or less client devices.

Content providers 112-116 interact with content delivery system 120 (e.g., over a network, such as a LAN, WAN, or the Internet) to enable content items to be presented, through publisher system 130, to end-users operating client devices 142-146. Thus, content providers 112-116 provide content items to content delivery system 120, which in turn selects content items to provide to publisher system 130 for presentation to users of client devices 142-146. However, at the time that content provider 112 registers with content delivery system 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 120.

Although depicted in a single element, content delivery system 120 may comprise multiple computing elements and devices, connected in a local network or distributed regionally or globally across many networks, such as the Internet. Thus, content delivery system 120 may comprise multiple computing elements, including file servers and database systems. For example, content delivery system 120 includes (1) a content provider interface 122 that allows content providers 112-116 to create and manage their respective content delivery campaigns and (2) a content delivery exchange 124 that conducts content item selection events in response to content requests from a third-party content delivery exchange and/or from publisher systems, such as publisher system 130.

Publisher system 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 130 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 130 provides the requested content (e.g., a web page) to the client device.

Simultaneously or immediately before or after the requested content is sent to a client device, a content request is sent to content delivery system 120 (or, more specifically, to content delivery exchange 124). That request is sent (over a network, such as a LAN, WAN, or the Internet) by publisher system 130 or by the client device that requested the original content from publisher system 130. For example, a web page that the client device renders includes one or more calls (or HTTP requests) to content delivery exchange 124 for one or more content items. In response, content delivery exchange 124 provides (over a network, such as a LAN, WAN, or the Internet) one or more particular content items to the client device directly or through publisher system 130. In this way, the one or more particular content items may be presented (e.g., displayed) concurrently with the content requested by the client device from publisher system 130.

In response to receiving a content request, content delivery exchange 124 initiates a content item selection event that involves selecting one or more content items (from among multiple content items) to present to the client device that initiated the content request. An example of a content item selection event is an auction.

Content delivery system 120 and publisher system 130 may be owned and operated by the same entity or party. Alternatively, content delivery system 120 and publisher system 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 124, and that bids for space (on one or more publisher systems, such as publisher system 130) to present content items on behalf of multiple content providers. Thus, a bidder is another source of content items that content delivery exchange 124 may select for presentation through publisher system 130. Thus, a bidder acts as a content provider to content delivery exchange 124 or publisher system 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery system 120 through, for example, content provider interface 122. An example of content provider interface 122 is Campaign Manager™ provided by LinkedIn. Content provider interface 122 comprises a set of user interfaces that allow a representative of a content provider to create an account for the content provider, create one or more content delivery campaigns within the account, and establish one or more attributes of each content delivery campaign. Examples of campaign attributes are described in detail below.

A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select, or click on the set of content items, when a certain number of users purchase a product/service associated with the content delivery campaign or fill out a particular form on a website, or when a budget of the content delivery campaign has been exhausted.

A content delivery campaign may specify one or more targeting criteria that are used to determine whether to present a content item of the content delivery campaign to one or more users. (In most content delivery systems, targeting criteria cannot be so granular as to target individual members.) Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 124 receives, from a computing device, a request that does not satisfy the targeting criteria, then content delivery exchange 124 ensures that any content items associated with the particular content delivery campaign are not sent to the computing device.

Thus, content delivery exchange 124 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 124 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 130 may not satisfy targeting criteria of one content item of a campaign, the same content request may satisfy targeting criteria of another content item of the campaign.

Different content delivery campaigns that content delivery system 120 manages may have different charge models. For example, content delivery system 120 (or, rather, the entity that operates content delivery system 120) may charge a content provider of one content delivery campaign for each presentation of a content item from the content delivery campaign (referred to herein as cost per impression or CPM). Content delivery system 120 may charge a content provider of another content delivery campaign for each time a user interacts with a content item from the content delivery campaign, such as selecting or clicking on the content item (referred to herein as cost per click or CPC). Content delivery system 120 may charge a content provider of another content delivery campaign for each time a user performs a particular action, such as purchasing a product or service, downloading a software application, or filling out a form (referred to herein as cost per action or CPA). Content delivery system 120 may manage only campaigns that are of the same type of charging model or may manage campaigns that are of any combination of the three types of charging models.

A content delivery campaign may be associated with a resource budget that indicates how much the corresponding content provider is willing to be charged by content delivery system 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 124 receives triggers a content item selection event.

For example, in response to receiving a content request, content delivery exchange 124 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 124 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery system 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, content delivery exchange 124 conducts one or more content item selection events. Thus, content delivery exchange 124 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that operates content delivery system 120 conducts one or more content item selection events. In this latter embodiment, content delivery system 120 sends one or more content items to the other exchange, which selects one or more content items from among multiple content items that the other exchange receives from multiple sources. In this embodiment, content delivery exchange 124 does not necessarily know (a) which content item was selected if the selected content item was from a different source than content delivery system 120 or (b) the bid prices of each content item that was part of the content item selection event. Thus, the other exchange may provide, to content delivery system 120, information regarding one or more bid prices and, optionally, other information associated with the content item(s) that was/were selected during a content item selection event, information such as the minimum winning bid or the highest bid of the content item that was not selected during the content item selection event.

Event Logging

Content delivery system 120 may log one or more types of events, with respect to content items, across client devices 142-146 (and other client devices not depicted). For example, content delivery system 120 determines whether a content item that content delivery exchange 124 delivers is presented at (e.g., displayed by or played back at) a client device. Such an "event" is referred to as an "impression." As another example, content delivery system 120 determines whether a user interacted with a content item that exchange 124 delivered to a client device of the user. Examples of "user interaction" include a view or a selection, such as a "click." Content delivery system 120 stores such data as user interaction data, such as an impression data set and/or a interaction data set. Thus, content delivery system 120 may include a user interaction database 126. Logging such events allows content delivery system 120 to track how well different content items and/or campaigns perform.

For example, content delivery system 120 receives impression data items, each of which is associated with a different instance of an impression and a particular content item. An impression data item may indicate a particular content item, a date of the impression, a time of the impression, a particular publisher or source (e.g., onsite v. offsite), a particular client device that displayed the specific content item (e.g., through a client device identifier), and/or a user identifier of a user that operates the particular client device. Thus, if content delivery system 120 manages delivery of multiple content items, then different impression data items may be associated with different content items. One or more of these individual data items may be encrypted to protect privacy of the end-user.

Similarly, an interaction data item may indicate a particular content item, a date of the user interaction, a time of the user interaction, a particular publisher or source (e.g., onsite v. offsite), a particular client device that displayed the specific content item, and/or a user identifier of a user that operates the particular client device. If impression data items are generated and processed properly, an interaction data item should be associated with an impression data item that corresponds to the interaction data item. From interaction data items and impression data items associated with a content item, content delivery system 120 may calculate an observed (or actual) user interaction rate (e.g., CTR) for the content item. Also, from interaction data items and impression data items associated with a content delivery campaign (or multiple content items from the same content delivery campaign), content delivery system 120 may calculate a user interaction rate for the content delivery campaign. Additionally, from interaction data items and impression data items associated with a content provider (or content items from different content delivery campaigns initiated by the content item), content delivery system 120 may calculate a user interaction rate for the content provider. Similarly, from interaction data items and impression data items associated with a class or segment of users (or users that satisfy certain criteria, such as users that have a particular job title), content delivery system 120 may calculate a user interaction rate for the class or segment. In fact, a user interaction rate may be calculated along a combination of one or more different user and/or content item attributes or dimensions, such as geography, job title, skills, content provider, certain keywords in content items, etc.

Enitty Profile Database

System 100 also includes entity profile database 128. Entity profile database 128 may reside in one or more storage systems that are within (or part of) content delivery system 120 (as depicted) or outside content delivery system 120.

Entity profile database 128 stores multiple entity profiles. Each entity profile in entity profile database 128 is provided by a different user. Example entities include users, groups of users, and organizations (e.g., companies, associations, government agencies, etc.). Each entity profile is provided by a different user or group/organization representative. An organization profile may include an organization name, a website, one or more phone numbers, one or more email addresses, one or more mailing addresses, a company size, a logo, one or more photos or images of the organization, an organization size, and a description of the history and/or mission of the organization. A user profile may include a first name, last name, an email address, residence information, a mailing address, a phone number, one or more educational/academic institutions attended, one or more academic degrees earned, one or more current and/or previous employers, one or more current and/or previous job titles, a list of skills, a list of endorsements, and/or names or identities of friends, contacts, connections of the user, and derived data that is based on actions that the candidate has taken. Examples of such actions include jobs to which the user has applied, views of job postings, views of company pages, private messages between the user and other users in the user's social network, and public messages that the user posted and that are visible to users outside of the user's social network (but that are registered users/members of the social network provider).

Some data within a user's profile (e.g., work history) may be provided by the user while other data within the user's profile (e.g., skills and endorsement) may be provided by a third party, such as a "friend," connection, colleague of the user.

One or more components of system 100 may prompt users to provide profile information in one of a number of ways. For example, system 100 may have provided a web page with a text field for one or more of the above-referenced types of information. In response to receiving profile information from a user's device, system 100 stores the information in an account that is associated with the user and that is associated with credential data that is used to authenticate the user to system 130 when the user attempts to log into system 100 at a later time. Each text string provided by a user may be stored in association with the field into which the text string was entered. For example, if a user enters "Sales Manager" in a job title field, then "Sales Manager" is stored in association with type data that indicates that "Sales Manager" is a job title. As another example, if a user enters "Java programming" in a skills field, then "Java programming" is stored in association with type data that indicates that "Java programming" is a skill.

In an embodiment, system 100 stores access data in association with a user's account. Access data indicates which users, groups, or devices can access or view the user's profile or portions thereof. For example, first access data for a user's profile indicates that only the user's connections can view the user's personal interests, second access data indicates that confirmed recruiters can view the user's work history, and third access data indicates that anyone can view the user's endorsements and skills.

In an embodiment, some information in a user profile is determined automatically by system 100. For example, a user specifies, in his/her profile, a name of the user's employer. System 100 determines, based on the name, where the employer and/or user is located. If the employer has multiple offices, then a location of the user may be inferred based on an IP address associated with the user when the user registered with a social network service (e.g., provided by publisher system 130) and/or when the user last logged onto the social network service.

While many examples herein are in the context of online social networking, embodiments are not so limited.

Micro Service Architecture

Figure 2:
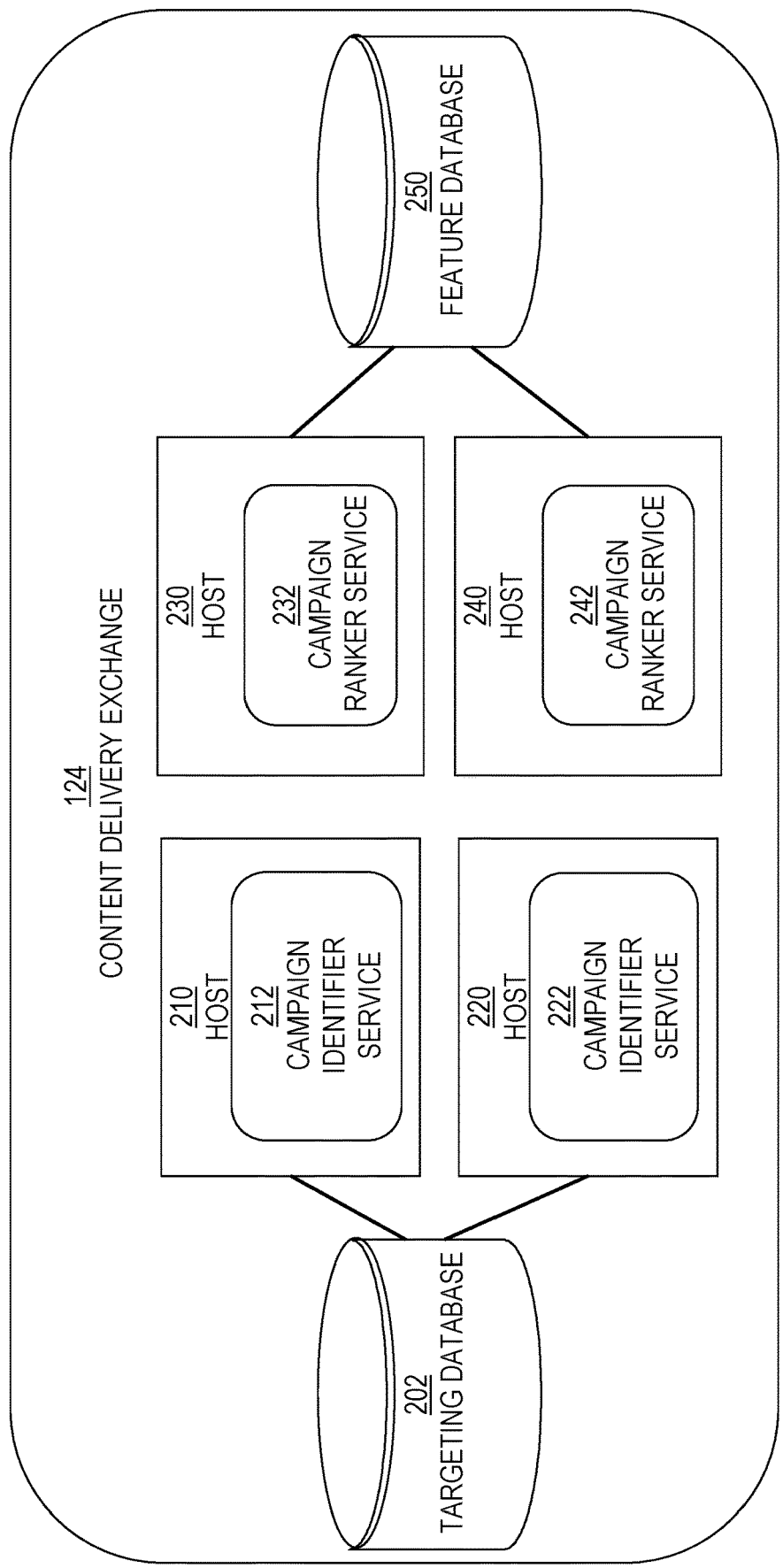
FIG. 2 is a block diagram that depicts (at least in part) a content delivery exchange according to microservice architecture principles, in an embodiment.

FIG. 2 is a block diagram that depicts (at least in part) content delivery exchange 124 according to microservice architecture principles, in an embodiment. A microservice is a service that executes on a computing device (referred to as a "host") and is part of a larger application that comprises multiple microservices.

Content delivery exchange 124 includes at least two microservices: a campaign identifier service and a campaign ranker service. Content delivery exchange 124 also includes multiple hosts that execute, respectively, instances of campaign identifier service and multiple hosts that execute, respectively, instances of campaign ranker service. For example, host 210 executes campaign identifier service 212 and host 220 executes campaign identifier service 222, while host 230 executes campaign identifier service 232 and host 240 executes campaign identifier service 242. Although each host is depicted as executing one instance of one microservice, each host may execute multiple instances of the same microservice and/or multiple instances of multiple microservices.

Content delivery exchange 124 also includes, in this embodiment, (1) a targeting database 202 that is communicatively coupled to hosts 210 and 220 and (2) feature database 250 that is communicatively coupled to hosts 230 and 240. There may be one or more computing devices that are communicatively coupled "between" the hosts and their respective databases, such that a request for data from one of these hosts is received and forwarded by the one or more computing devices and responses from the databases are returned through the one or more computing devices.

Targeting database 202 may be entity profile database 128 or may be derived based on the information in entity profile database 128. However, a content provider may be able to specify a strict subset of entity attributes that are indicated in an entity profile. For example, an entity profile may include an attribute or field for the city or town of an entity, but content providers are not allowed to specify a city or town as a targeting criterion for their respective content delivery campaigns. As another example, an individual entity (e.g., member) may provide input that causes a privacy setting to be stored in association with a particular attribute, the privacy setting indicating that the entity does not wish to be targeted by content providers based on that particular attribute.

Feature database 250 includes, for each of multiple entities, a set of feature data for an entity that is indicated in targeting database 202 or profile database 128. A set of feature data comprises values of features of a model that is used to compute or generate a score for a content delivery campaign or a content item thereof. In one embodiment, the higher the score, the higher the likelihood that the entity will interact with the content item, such as viewing the content item for a certain period of time, selecting (e.g., clicking on) the content item, filling out a form, making a purchase, or registering for an event, service, or physical item. The model may be a rule-based model or a machine-learned model. If the model comprises one hundred features, then each set of feature data may include up to one hundred feature values.

Example features for the model include features of a content delivery campaign ("campaign features"), features of an entity ("entity features"), cross features (or features that are based on a combination of entity features and campaign features), and contextual features (e.g., time of day, day of week, holiday or not, type of computing device that the entity is operating, type of operating system of the computing device, type of page on which the content item will be presented, location on the page).

Example campaign features include identity of the content provider that initiated the content delivery campaign, a click-through rate of the content provider, a click-through rate of content items of the content delivery campaign (if it includes multiple content items), a click-through rate of a particular content item of the content delivery campaign, keywords found in the particular content item, an industry of the content provider, and a geographic region of the content provider.

Example entity features include profile attributes that are found in entity profiles (e.g., job title, academic degree, skills, industry, seniority level, geographic region, etc.) and online activity features, such as how often the entity logs into a certain website, a number of selections (e.g., clicks) of content items in the last two weeks, a click-through rate of the entity, a click-through rate of the entity with respect to content items sharing one or more attributes in common, a click-through rate of the particular content item by entities that are deemed similar to the entity, a number of messages transmitted by the entity to other entities in the entity's network, a number of edits to the entity's profile in the last two weeks, etc.

Example cross features include whether the entity and the content delivery campaign are both associated with the same industry, the same geographic region, one or more keywords, and/or one or more skills.

Rule-Based Model

Scoring entities based on feature data may be performed in a number of ways. For example, rules may be established that identify certain profile attributes and/or count certain activities of an entity, each profile attribute and count corresponding to a different score and, based on a combination of all the scores, determine a score for the entity. For example, a user "following" a company online may result in three points, the user establishing one or more connections with employees at one or more companies in a particular region may be result in five points (bringing the total to eight points), and the user sending multiple messages to those employees may result in ten points (bringing the total to eighteen points). If a user reaches twenty points, then it is predicted that the user will select a content item from a content delivery campaign established by the company.

Rules may be determined manually by analyzing characteristics of users who have selected content items in the past. For example, it may be determined that 56% of users who made a new connection to an employee of an organization in a region, sent multiple messages to the new connection, and applied to multiple job positions associated with the region ultimately selected a content item associated with the organization.

A rule-based model has numerous disadvantages. One disadvantage is that it fails to capture nonlinear correlations. For example, if a user clicks on (or otherwise selects) a significant number of content items, then the model may compute a high score, since the user accumulates, for example, five points for each click on a content item. However, there may be diminishing returns for each click after a certain number. The most likely users may request, for example, between five and eight clicks within a week period. Clicking on content items past this may not indicate a significant probability of conversion. In fact, it may even be the case that clicking on many content items is a negative signal for conversion. For example, such behavior could indicate a fraudulent entity or application that clicks on many content items. In addition, complex interactions of features cannot be represented by such rule-based models.

Another issue with a rule-based prediction model is that the hand-selection of values (e.g., weights or coefficients) for each feature is error-prone, time consuming, and non-probabilistic. Hand-selection also allows for bias from potentially mistaken business logic.

A third disadvantage is that output of a rule-based model is an unbounded positive or negative value. The output of a rule-based model does not intuitively map to the probability of a click, conversion, or other type of action for which the model is optimizing (e.g., predicting). In contrast, machine learning methods are probabilistic and therefore can give intuitive probability scores.

Machine-Learned Model

In an embodiment, one or more models are generated based on training data using one or more machine learning techniques. Machine learning is the study and construction of algorithms that can learn from, and make predictions on, data. Such algorithms operate by building a model from inputs in order to make data-driven predictions or decisions. Thus, a machine learning technique is used to generate a statistical model that is trained based on a history of attribute values associated with users and regions. The statistical model is trained based on multiple attributes (or factors) described herein. In machine learning parlance, such attributes are referred to as "features." To generate and train a statistical model, a set of features is specified and a set of training data is identified.

Embodiments are not limited to any particular machine learning technique for generating or training a model. Example machine learning techniques include linear regression, logistic regression, random forests, naive Bayes, and Support Vector Machines (SVMs). Advantages that machine-learned models have over rule-based models include the ability of machine-learned models to output a probability (as opposed to a number that might not be translatable to a probability), the ability of machine-learned models to capture non-linear correlations between features, and the reduction in bias in determining weights for different features.

A machine-learned model may output different types of data or values, depending on the input features and the training data. For example, training data may comprise, for each entity, multiple feature values, each corresponding to a different feature. Example features include the features described previously. In order to generate the training data, information about each entity-content delivery campaign pair is analyzed to compute the different feature values. In this example, the dependent variable of each training instance may be whether the entity interacted with a content item from the content delivery campaign.

Initially, the number of features that are considered for training may be significant. After training a machine-learned model and validating the model, it may be determined that a subset of the features have little correlation or impact on the final output. In other words, such features have low predictive power. Thus, machine-learned weights for such features may be relatively small, such as 0.01 or −0.001. In contrast, weights of features that have significant predictive power may have an absolute value of 0.2 or higher. Features will little predictive power may be removed from the training data. Removing such features can speed up the process of training future models and computing output scores.

Example Process

Figure 3:
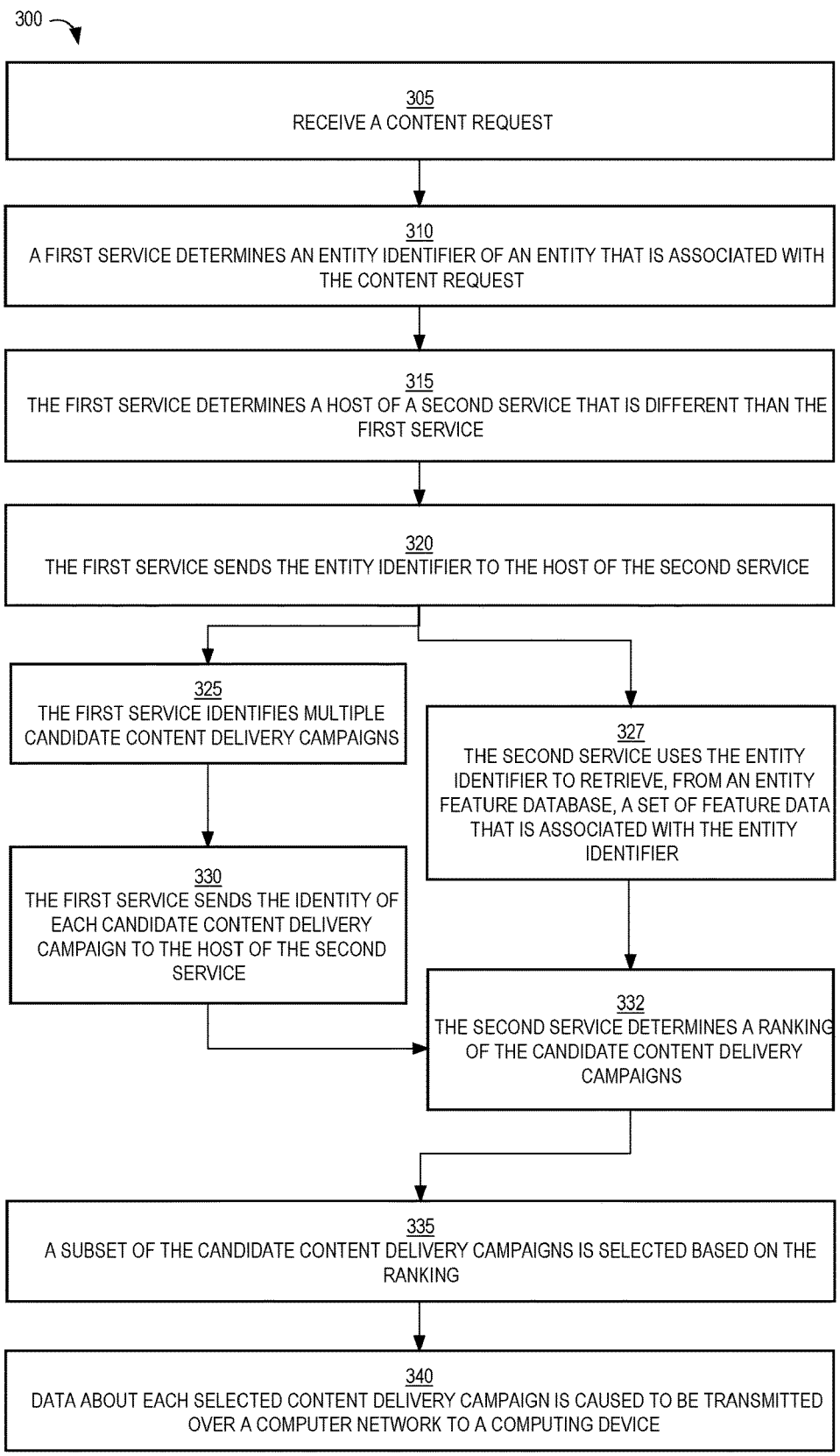
FIG. 3 is a flow diagram that depicts an example process for microservices processing a content request, in an embodiment.

FIG. 3 is a flow diagram that depicts an example process 300 for microservices processing a content request, in an embodiment. Process 300 is implemented by content delivery system 120 and, in particular, by content delivery exchange 124, at least in part.

At block 305, a content request is received. Block 305 may be performed by host 210, which may have received the content request from another component of content delivery system 120. The content request may be initiated by a client device (e.g., client device 142) or by a third party content exchange (not depicted) that sends a copy of the content request to multiple content delivery systems (including content delivery system 120), where each conducts a respective content item selection event and returns, to the third party content exchange, a content item associated with a selected content delivery campaign.

At block 310, an entity identifier of an entity associated with the content request is determined. Block 310 is performed by a first (micro) service, such as campaign identifier service 212. The entity may be a user, a group, or an organization. The entity identifier may be included in the content request. Alternatively, the entity identifier may be looked up in a mapping that maps request-associated identifiers (which are included in content requests) with entity identifiers. Examples of request-associated identifiers include an IP address, a cookie identifier, and a MAC address. The mapping may include multiple request-associated identifiers that map to the same entity identifier, such as multiple cookie identifiers to the same entity identifier.

At block 315, the first service determines a host of a second service that is different than the first service. For example, campaign identifier service 222 determines host 230, which hosts or executes campaign ranker service 232. As another example, a load balancer that resides on host 220 (or on a computing device that is logically between host 220 and host 230) determines the host of the second service.

The host may be determined based on one or more data elements items, such as the entity identifier, a device identifier, a browser identifier, and/or an application identifier. For example, the entity identifier may be input to a hash function that computes a hash value. If there are one hundred hosts, then the hash value may be limited to a value between 0 and 99. Each host (that executes an instance of the second service) may be assigned (or associated with) one or more hash values and/or one or more hash value ranges. Such an assignment or association is referred to as a hash-host mapping. Thus, each host that executes an instance of the first service has access to such hash-host mapping.

At block 320, the first service sends the entity identifier to the host of the second service. Having the entity identifier allows the second service to begin executing its functionality before the first service completes executing its functionality. Therefore, the second service does not have to wait to begin executing (with respect to the content request) until the first service is done executing with respect to the content request.

At block 325, the first service identifies multiple candidate content delivery campaigns. Block 330 may involve the first service sending the entity identifier to targeting database 202 and receiving, from targeting database 202, targeting data associated with the entity. Block 325 also involves the first service comparing the targeting criteria associated with the entity with targeting criteria associated with each of multiple content delivery campaigns. The targeting criteria of multiple content delivery campaigns may be stored locally on the host on which the first service executes or may be stored on a separate storage device that the host accesses. In order to speed up block 325, such comparing may involve using one or more indexes to avoid having to compare the targeting criteria associated with the entity to each active content delivery campaign.

At block 327, the second service uses the entity identifier to retrieve, from feature database 250, a set of feature data that is associated with the entity identifier. Because block 327 is performed by a different service than the host that is performing block 325, blocks 325-327 may be performed in parallel.

The first service and second service are not necessarily executing on different hosts, but, in many scenarios, they will be executing on different hosts. The two services might run on one host if they are deployed on that host. The first service on that one host would communicate with the second service on that one host if the entity identifier associated with a content request maps to the second service.)

Block 327 involves storing the set of feature data in cache that is local relative to the host of the second service. The time-to-live (TTL) of the set of feature data in the cache may be relatively short, such that the set of feature data remains in the cache for a very short period, such as a few tens of milliseconds. A reason to keep the TTL short is the second request to the second service from the first service should arrive shortly after. Keeping a long TTL may add memory usage for the second service. Block 327 may complete before block 325 or vice versa.

At block 330, the first service sends an identity of the candidate content delivery campaigns to the host of the second service. Again, block 330 may begin prior to, or subsequent to, block 327 being complete. Block 330 may involve (a) opening a connection between the host executing the first service and the host of (i.e., executing) the second service and (b) sending the identity of the candidate content delivery campaigns using the connection. The identity may be a list of campaign identifiers. Again, the identity of the host may be determined based on the entity identifier associated with the content request.

Block 330 may also involve the first service sending feature data of each candidate content delivery campaign to the host of the second service. Alternatively, the second service retrieves the feature data of each candidate content delivery campaign based on the identities thereof received from the first service. In this way, if there are any changes to the number or composition of campaign features in the ranking model, only the second service would need to be updated or modified, not the first service.

At block 332, the second service determines, based on the set of feature data retrieved in block 327 a ranking of the candidate content delivery campaigns based on the set of feature data associated with the entity identifier. Block 332 may involve the second service computing a score for each candidate content delivery campaign and ranking the campaigns based on their respective scores. Computing a score may involve the second service inputting the set of feature data (retrieved in block 327) and any campaign feature data into a (e.g., machine-learned) model, which generates the score.

The beginning of block 332 may involve the second service determining whether the set of feature data is stored in local cache of the host on which the second service is executing. If the set of feature data is not stored in the local cache (e.g., there is no feature data associated with the entity identifier in the local cache), then a request for retrieval of the feature data may be made again. Alternatively, the local cache may include an entry that is associated with the entity identifier but where the entry indicates that a request for the feature data has been made. In other words, the feature data is in transit and will be stored in the local cache shortly (e.g., a few milliseconds). In this way, a second request for the feature data may be avoided.

At block 335, the second service (or another service) selects a subset of the candidate content delivery campaigns based on the ranking. For example, the second service selects the campaign that is associated with the highest score among the campaigns or selects the campaigns associated with a score in the top five.

At block 340, data about each content delivery campaign in the subset is caused to be transmitted over a computer network to a computing device that initiated the content request. The computing device may be a client device (e.g., client device 142) or a third party content exchange. Block 340 may involve selecting a content item from each content delivery campaign, if one or more campaigns in the subset are associated with multiple content items. The "transmitting" may involve sending the selected content item(s) to the computing device. Alternatively, the transmitting may involve sending an identity of each selected content item to the computing device and the computing device, in response to receiving the identity, sends a request to a remote source that stores the selected content item(s).

The time from block 305 to 340 may involve a few tens of milliseconds or a couple hundred milliseconds. The faster the response to a content request, the more likely that a third party exchange will select the transmitted data or that a user that is operating the computing device will view and interact with the transmitted data.

Benefits of process 300 include avoiding the cost of remote cache storage and improving (i.e., reducing) latency significantly.

Host Shut Down

In some scenarios, a host that is executing a second (e.g., ranking) service is shutdown, either due to failure or in response to user input for maintenance, such as to update software (potentially including the second service) executing on the host. If the second service has received an entity identifier from a first service and is in the process of retrieving entity feature data based on the entity identifier, but the host on which the second service is executing is taken down, then the first service will be unable to send, to the host, the identity of multiple candidate content delivery campaigns that the first service has identified. Thus, the first service will need to identify another host executing another instance of the second service and send the identity of the candidate content delivery campaigns to that other host.

In an embodiment, if there is control over when a particular host executing the second service is taken down, then the particular host is made undiscoverable to all hosts executing an instance of the first service. However, for those hosts that have already sent an entity identifier to the particular host and have not yet sent the identity of the candidate content delivery campaigns, those hosts still maintain host data that identifies the particular host and may still leverage the host data until process 300 (with respect to the corresponding content request and the host data) is complete. Thus, those hosts are still able to communicate the identity of the candidate content delivery campaigns to the particular host. Once no more hosts store host data that identifies the particular host, then the particular host may be made unavailable (e.g., taken offline) permanently or for maintenance. The time between making the particular host undiscoverable to unavailable for any processing may be a few tens of milliseconds or a couple hundreds of milliseconds.

Making the particular host undiscoverable may involve updating, on each host that executes an instance of the first service, a hash-host mapping to remove the identity of the particular host from the mapping. An identity of another host may replace, in the mapping, the identity of the particular host. If the particular host comes back online and is available to host an instance of the second service, then the hash-host mappings may be updated back to its previous state.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
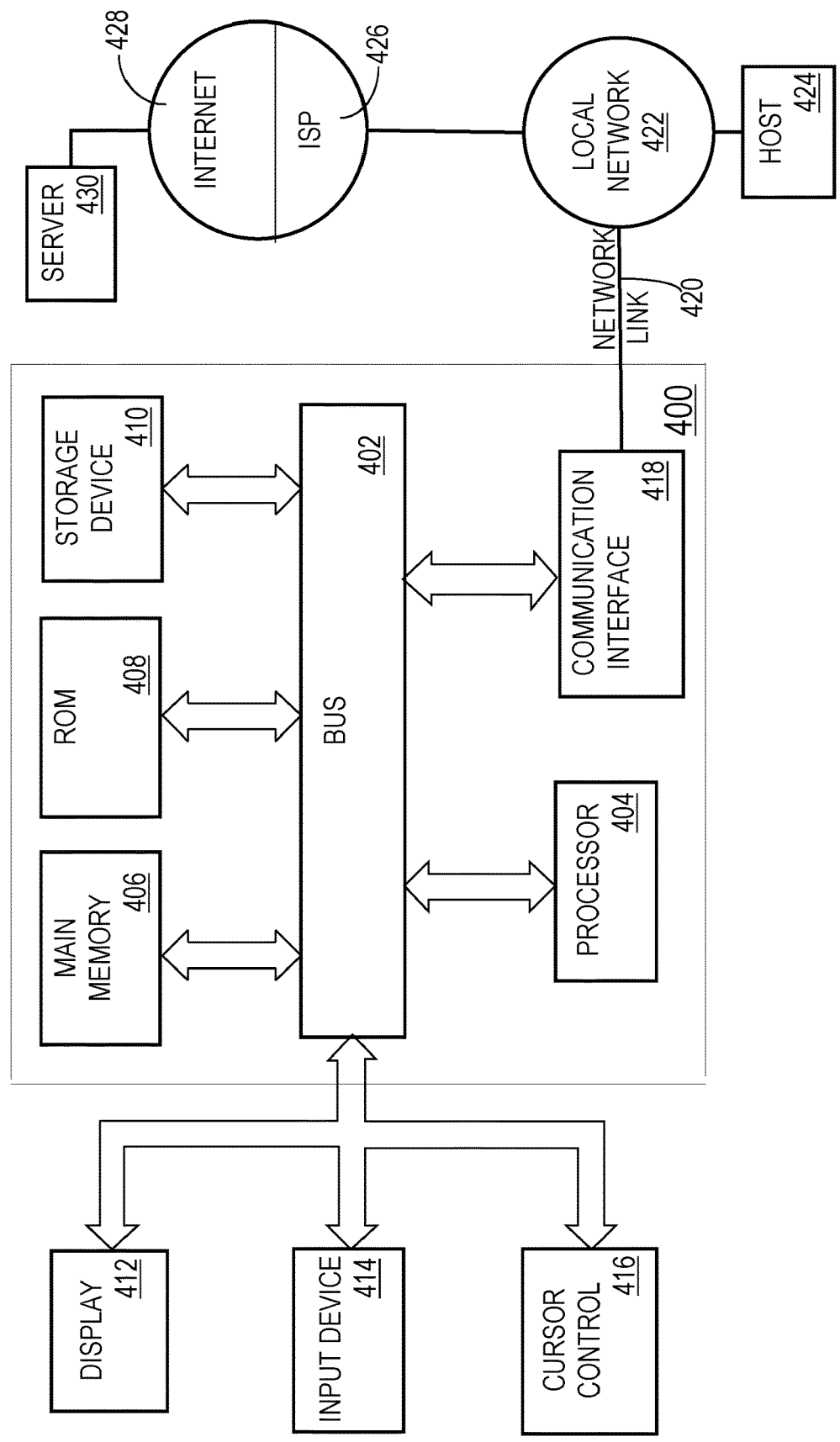
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   in response to receiving a content request:
      determining, at a first microservice, an entity identifier of an entity associated with the content request;
      determining a host of a second microservice that is different than the first microservice;
      sending, by the first microservice, to the host of the second microservice, the entity identifier;
   in response to receiving the entity identifier from the first microservice at the second microservice and while the first microservice is identifying a set of content delivery campaigns, prefetching, by the second microservice executing on the host, entity feature data that is associated with the entity identifier;
   storing the prefetched entity feature data without using a remote cache;
   in response to the first microservice identifying the set of content delivery campaigns and while the second microservice is prefetching the entity feature data:
      identifying, by the first microservice, the host of the second microservice;
      sending, by the first microservice, to the host of the second microservice, an identity of the set of content delivery campaigns;
   based on the entity feature data prefetched by the second microservice and the set of content delivery campaigns identified by the first microservice, determining, by the host of the second microservice, a ranking of the set of content delivery campaigns;
   selecting a subset of the set of content delivery campaigns based on the ranking; and
   causing data about each content delivery campaign in the subset to be transmitted over a computer network to a computing device;
   wherein the method is performed by one or more computing devices.

2. The method of claim 1, wherein:
   the first microservice executes on a first host;
   the host is a second host that is different than the first host.

3. The method of claim 1, further comprising:
   in response to receiving the content request, determining, based on one or more data elements associated with the content request, a hash value;
   wherein determining the host is based on the hash value.

4. The method of claim 3, wherein the one or more data elements includes the entity identifier.

5. The method of claim 1, wherein the content request is a first content request, the entity identifier is a first entity identifier, the host is a first host, and the set of content delivery campaigns is a first set of content delivery campaigns, further comprising:
   in response to receiving a second content request:
      determining a second entity identifier of a second entity associated with the second content request;
      determining, by the first microservice, a second host, of the second microservice, that is different than the first host;
      sending, by the first microservice, to the second host of the second microservice, the second entity identifier;
      in response to receiving the second entity identifier from the first microservice retrieving, by the second microservice executing on the second host, second entity feature data that is associated with the entity identifier;

identifying, by the first microservice, a second set of content delivery campaigns;

sending, by the first microservice to the second host of the second microservice, a second identity of the second set of content delivery campaigns;

based on the second entity feature data, determining, by the second host of the second microservice, a second ranking of the second set of content delivery campaigns;

selecting a second subset of the second set of content delivery campaigns based on the second ranking;

causing second data about each content delivery campaign in the second subset to be transmitted over a second computer network to a second computing device.

6. The method of claim 1, further comprising:
based on the entity identifier, retrieving targeting data that is associated with the entity;
wherein identifying the set of content delivery campaigns is based on the targeting data.

7. The method of claim 6, wherein retrieving the targeting data comprises retrieving the targeting data from an entity profile that is stored in a profile database that comprises a plurality of entity profiles that includes the entity profile.

8. The method of claim 1, further comprising:
retrieving, by the host of the second microservice, from an entity feature database, based on the entity identifier, entity feature data that is associated with the entity;
wherein determining the ranking of the set of content delivery campaigns is based on the entity feature data.

9. The method of claim 8, further comprising:
for each content delivery campaign in the set of content delivery campaigns, retrieving, by the host of the second microservice, campaign feature data that is associated with said each content delivery campaign;
wherein determining the ranking of the set of content delivery campaigns is also based on the campaign feature data associated with each content delivery campaign.

10. The method of claim 8, wherein determining the ranking of the set of content delivery campaigns comprises:
for each content delivery campaign in the set of content delivery campaigns:
identifying a set of feature values of said each content delivery campaign;
inputting the set of feature values and the entity feature data into a machine-learned model to generate a score;
adding the score to a score set;
wherein determining the ranking is based on the scores in the score set.

11. One or more storage media storing instructions which, when executed by one or more processors, cause:
in response to receiving a content request:
determining, at a first microservice, an entity identifier of an entity associated with the content request;
determining a host of a second microservice that is different than the first microservice;
sending, by the first microservice, to the host of the second microservice, the entity identifier;
in response to receiving the entity identifier from the first microservice at the second microservice and while the first microservice is identifying a set of content delivery campaigns, prefetching, by the second microservice executing on the host, entity feature data that is associated with the entity identifier;
storing the prefetched entity feature data without using a remote cache;
in response to the first microservice identifying the set of content delivery campaigns and while the second microservice is prefetching the entity feature data:
identifying, by the first microservice, the host of the second microservice;
sending, by the first microservice, to the host of the second microservice, an identity of the set of content delivery campaigns;
based on the entity feature data prefetched by the second microservice and the set of content delivery campaigns identified by the first microservice, determining, by the host of the second microservice, a ranking of the set of content delivery campaigns;
selecting a subset of the set of content delivery campaigns based on the ranking; and
causing data about each content delivery campaign in the subset to be transmitted over a computer network to a computing device.

12. The one or more storage media of claim 11, wherein:
the first microservice executes on a first host;
the host is a second host that is different than the first host.

13. The one or more storage media of claim 11, wherein the instructions, when executed by the one or more processors, further cause:
in response to receiving the content request, determining, based on one or more data elements associated with the content request, a hash value;
wherein determining the host is based on the hash value.

14. The one or more storage media of claim 13, wherein the one or more data elements includes the entity identifier.

15. The one or more storage media of claim 11, wherein the content request is a first content request, the entity identifier is a first entity identifier, the host is a first host, and the set of content delivery campaigns is a first set of content delivery campaigns, wherein the instructions, when executed by the one or more processors, further cause:
in response to receiving a second content request:
determining a second entity identifier of a second entity associated with the second content request;
determining, by the first microservice, a second host, of the second microservice, that is different than the first host;
sending, by the first microservice, to the second host of the second microservice, the second entity identifier;
in response to receiving the second entity identifier from the first microservice, retrieving, by the second microservice executing on the second host, second entity feature data that is associated with the entity identifier;
identifying, by the first microservice, a second set of content delivery campaigns;
sending, by the first microservice, to the second host of the second microservice, a second identity of the second set of content delivery campaigns;
based on the second entity feature data, determining, by the second host of the second microservice, a second ranking of the second set of content delivery campaigns;
selecting a second subset of the second set of content delivery campaigns based on the second ranking;

causing second data about each content delivery campaign in the second subset to be transmitted over a second computer network to a second computing device.

16. The one or more storage media of claim 11, wherein the instructions, when executed by the one or more processors, further cause:
    based on the entity identifier, retrieving targeting data that is associated with the entity;
    wherein identifying the set of content delivery campaigns is based on the targeting data.

17. The one or more storage media of claim 16, wherein retrieving the targeting data comprises retrieving the targeting data from an entity profile that is stored in a profile database that comprises a plurality of entity profiles that includes the entity profile.

18. The one or more storage media of claim 11, wherein the instructions, when executed by the one or more processors, further cause:
    retrieving, by the host of the second microservice, from an entity feature database, based on the entity identifier, entity feature data that is associated with the entity;
    wherein determining the ranking of the set of content delivery campaigns is based on the entity feature data.

19. The one or more storage media of claim 18, wherein the instructions, when executed by the one or more processors, further cause:
    for each content delivery campaign in the set of content delivery campaigns, retrieving, by the host of the second microservice, campaign feature data that is associated with said each content delivery campaign;
    wherein determining the ranking of the set of content delivery campaigns is also based on the campaign feature data associated with each content delivery campaign.

20. The one or more storage media of claim 18, wherein determining the ranking of the set of content delivery campaigns comprises:
    for each content delivery campaign in the set of content delivery campaigns:
        identifying a set of feature values of said each content delivery campaign;
        inputting the set of feature values and the entity feature data into a machine-learned model to generate a score;
        adding the score to a score set;
    wherein determining the ranking is based on the scores in the score set.

* * * * *